United States Patent
Wallis

(10) Patent No.: US 8,496,440 B2
(45) Date of Patent: Jul. 30, 2013

(54) METHOD OF MANUFACTURING AN AEROFOIL

(75) Inventor: Michael J. Wallis, Clitheroe (GB)

(73) Assignee: Rolls-Royce PLC, London (GB)

( * ) Notice: Subject to any disclaimer, the term of this patent is extended or adjusted under 35 U.S.C. 154(b) by 763 days.

(21) Appl. No.: 12/702,920

(22) Filed: Feb. 9, 2010

(65) Prior Publication Data
US 2010/0226781 A1    Sep. 9, 2010

(30) Foreign Application Priority Data

Mar. 4, 2009 (GB) .................................. 0903614.6

(51) Int. Cl.
*F01D 5/18* (2006.01)

(52) U.S. Cl.
USPC ........ 416/232; 416/233; 416/241 B; 416/243; 416/223 A; 416/224; 29/889.1; 29/889.7; 29/889.72; 29/889.721; 29/889.722

(58) Field of Classification Search
USPC .................. 416/232, 233, 241 R, 241 B, 243, 416/223 A, 223 R, 224; 29/889.1, 889.7, 29/889.72, 889.721, 889.722
See application file for complete search history.

(56) References Cited

U.S. PATENT DOCUMENTS

| | | | | |
|---|---|---|---|---|
| 5,429,877 A | * | 7/1995 | Eylon | 416/232 |
| 5,692,881 A | * | 12/1997 | Leibfried | 416/233 |
| 5,711,068 A | * | 1/1998 | Salt | 29/889.1 |
| 5,797,239 A | * | 8/1998 | Zaccone et al. | 52/793.1 |
| 6,705,011 B1 | | 3/2004 | Leibfried et al. | |
| 6,739,049 B2 | * | 5/2004 | Nicholson | 29/889.72 |
| 7,526,862 B2 | * | 5/2009 | Leveque et al. | 29/889.7 |

FOREIGN PATENT DOCUMENTS

| | | |
|---|---|---|
| EP | 1 338 353 A1 | 8/2003 |
| EP | 1 605 135 A2 | 12/2005 |
| GB | 2 086 772 A | 5/1982 |
| GB | 2 306 353 A | 5/1997 |

OTHER PUBLICATIONS

British Search Report issued fur British Application No. 0903614.6 on Mar. 26, 2009.

* cited by examiner

*Primary Examiner* — Igor Kershteyn
(74) *Attorney, Agent, or Firm* — Oliff & Berridge, PLC

(57) ABSTRACT

A method of manufacturing an aerofoil structure capable of being diffusion bonded and superplastically formed to create a substantially hollow cavity within the aerofoil structure, the method comprising: providing a metallic plate for forming the aerofoil structure; joining mounting elements to opposing end surfaces of said metallic plate; dividing said plate along a plane extending substantially in a span-wise direction so as to produce two metallic panels each with one of said mounting elements joined thereto; assembling the two metallic panels so that the surfaces of the panels opposite to the surfaces which have been divided are facing each other; and joining the two metallic panels to one another to form the aerofoil structure; wherein the mounting elements are joined to one another to form the root of the aerofoil.

16 Claims, 2 Drawing Sheets

METHOD OF MANUFACTURING AN AEROFOIL

BACKGROUND

This invention relates to an aerofoil structure and method of manufacturing an aerofoil structure, and particularly but not exclusively to a substantially hollow aerofoil structure which is superplastically formed.

It is known to manufacture hollow metallic aerofoils for example to be used as blades in a jet engine, and in particular fan blades for a turbomachine, by superplastic forming and diffusion bonding metallic panels, the panels forming pressure and suction surfaces of the blade. These blades are generally referred to as wide-chord fan blades. The metallic panels may include elementary metal, metal alloys and metal matrix composites. At least one of the metallic panels must be capable of superplastic extensions. In one known process the surfaces of the panels to be joined are cleaned, and at least one surface of one or more of the panels is coated in preselected areas with a stop-off material to prevent diffusion bonding. The panels are arranged in a stack and the edges of the panels are welded together, except where a pipe is welded to the panels, to form an assembly. The pipe enables a vacuum, or inert gas pressure, to be applied to the interior of the assembly. The assembly is placed in an autoclave and heated so as to "bake out" the binder from the material to prevent diffusion bonding. The assembly is then evacuated, using the pipe, and the pipe is sealed. The sealed assembly is placed in a pressure vessel and is heated and pressed to diffusion bond the panels together to form an integral structure. Diffusion bonding occurs when two mating surfaces are pressed together under temperature, time and pressure conditions that allow atom interchange across the interface. The first pipe is removed and a second pipe is fitted to the diffusion bonded assembly at the position where the first pipe was located. The integral structure is located between appropriately shaped dies and is placed within a rig. The integral structure and dies are heated and pressurised fluid is supplied through the second pipe into the interior of the integral structure to cause at least one of the panels to be superplastically formed to produce an article matching the shape of the dies.

In addition to the hollow structure just described, it is also known to insert a membrane 2 between the metallic panels 4, 6 prior to the above described process (see FIG. 1 for example). The location of diffusion bonds between the membrane and the adjacent panels can be controlled by applying the stop-off material to preselected areas on each side of the membrane (or respective panels). When the aerofoil is subsequently expanded, the membrane adheres to the panels where the diffusion bond is allowed to form and thereby provides an internal structure.

FIG. 1 illustrates a known method of manufacturing an aerofoil structure. In this method a metallic sheet 2, made from, for example titanium, is provided for forming the aerofoil structure. The sheet 2 is forged so as to produce two sections 4 of the sheet which are thicker than the main body of the sheet 2. This may be achieved by upset forging, wherein the length of the sheet is reduced in order to obtain the desired increase in cross-section or by drawing the sheet so as to increase the length and reduce the thickness of the main body of the sheet. The sheet 2 may be machine finished prior to the forging and/or splitting/dividing process.

As illustrated in FIG. 1(c) the forged sheet 2 is divided along an inclined plane 6 extending in a span-wise direction, so as to produce two substantially identical panels 8 and 10. The panels 8 and 10 need not be identical and alternative configurations may be used in order to provide desired properties for the resulting aerofoil e.g. the panels may be of differing thickness. The sheet 2 may be divided into the two panels 8 and 10 by way of any known technique which may be suitable for cutting the required width of the aerofoil, for example by using a band saw. To facilitate the cutting process, channels may be machined inboard of the elements 4 to allow the band saw to enter the workpiece, as described in patent application GB2306353 (see FIG. 2). The resulting panels 8 and 10 taper from the section 4 to the tip end of the panel.

The two panels 8 and 10 are then assembled so that their uncut exterior surfaces (which have been machine finished) are facing each other. Optionally, a membrane 12 may be positioned between the panels 8 and 10. As previously described, the assembly may then be diffusion bonded and superplastically formed in order to produce the desired external shape of the aerofoil. When joined, the sections 4 combine to form the root of the aerofoil which serves in use to attach the aerofoil, for example, to the hub of the rotor.

This method of manufacturing an aerofoil structure has certain disadvantages attributable to the forging process which is necessary in order to obtain the sections 4 that form the root of the aerofoil once the two panels 8 and 10 are assembled. In particular the thickness of the root is limited by the forging process such that it is often not possible to produce a root with the required thickness for the application. Furthermore, since the root and aerofoil structures experience different working loads and environments, it is desirable for these structures to have different material properties. This is not possible in the prior art method. GB2306353 does disclose a further step for increasing the thickness of the root, where additional blocks are joined to the root element. However the root element still comprises the material of the aerofoil structure and thus it is still not possible to obtain substantially different properties for the root and aerofoil structures.

EP1605135 discloses a method of making and joining an aerofoil and root wherein an aerofoil structure is prefabricated and then joined to a root element by means of electron beam welding or linear friction welding. This method requires the root element and also the joining surface of the aerofoil structure to be machined prior to joining. This therefore adds additional steps to the process which increases costs and manufacturing time.

SUMMARY

According to a first aspect of the present invention there is provided a method of manufacturing an aerofoil structure capable of being diffusion bonded and superplastically formed to create a substantially hollow cavity within the aerofoil structure, the method comprising: providing a metallic plate for forming the aerofoil structure; joining mounting elements to opposing end surfaces of said metallic plate; dividing said plate along a plane extending substantially in a span-wise direction so as to produce two metallic panels each with one of said mounting elements joined thereto; assembling the two metallic panels so that the surfaces of the panels opposite to the surfaces which have been divided are facing each other; and joining the two metallic panels to one another to form the aerofoil structure; wherein the mounting elements are joined to one another to form the root of the aerofoil.

The metallic plate and mounting element and/or the two metallic panels may be joined by any suitable method such as one or more of: diffusion bonding, friction stir welding, linear friction welding, electron beam welding, or press bonding.

The mounting elements may be aligned with the metallic plate so as to form a substantially uniform joining surface on the divided panels.

The mounting elements may be made from a different metallic material from that of the metallic plate.

According to a second aspect of the present invention there is provided a method of manufacturing an aerofoil structure capable of being diffusion bonded and superplastically formed to create a substantially hollow cavity within the aerofoil structure, the method comprising: providing a metallic plate for forming the aerofoil structure; dividing said plate along a plane extending substantially in a span-wise direction so as to produce two metallic sheets; joining mounting elements to one end surface of each of said two metallic sheets to form two metallic panels; assembling the two metallic panels so that the surfaces of the panels opposite to the surfaces which have been divided are facing each other; and joining the two metallic panels to one another to form the aerofoil structure; wherein the mounting elements are joined to one another to form the root of the aerofoil.

The metallic sheet and mounting element and/or the metallic panels may be joined by any suitable method such as one or more of: diffusion bonding, friction stir welding, linear friction welding, electron beam welding, or press bonding.

The mounting elements may be aligned with the metallic sheets so as to form a substantially uniform joining surface.

The mounting elements may be made from a different metallic material from that of the metallic sheets.

The root of the aerofoil may be thicker than the thickness of the joined metallic sheets.

According to a third aspect of the present invention there is provided a substantially hollow aerofoil structure comprising two metallic panels, each metallic panel comprising a metallic sheet joined to a mounting element; the metallic panels being joined together so that the metallic sheets form the aerofoil and the mounting elements form the root of the aerofoil.

The mounting elements may be aligned with the metallic sheets so as to form a substantially uniform joining surface.

The root of the aerofoil may be thicker than the thickness of the joined metallic sheets.

The metallic sheet and mounting element and/or the metallic panels may be joined by one or more of: diffusion bonding, friction stir welding, electron beam welding, or press bonding.

The joined metallic panels may be superplastically formed.

The aerofoil structure may further comprise a membrane sheet between the two metallic panels.

The mounting elements may be made from a different metallic material from that of the metallic sheet.

For a better understanding of the present invention, and to show more clearly how it may be carried into effect, reference will now be made, by way of example, to the accompanying drawings, in which:

DETAILED DESCRIPTION OF THE EMBODIMENTS

Figure 1:
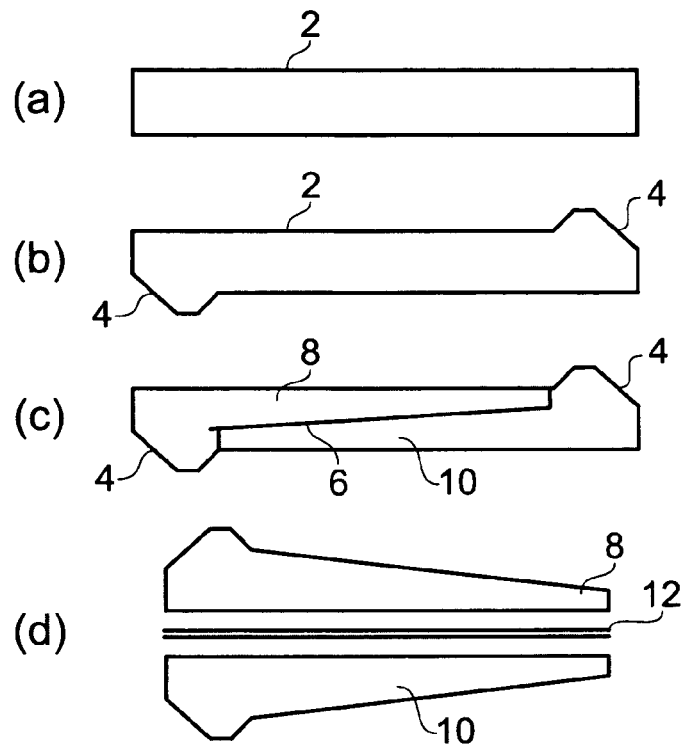
FIG. 1 shows a plan view of a known method of manufacturing an aerofoil.
Figure 2:
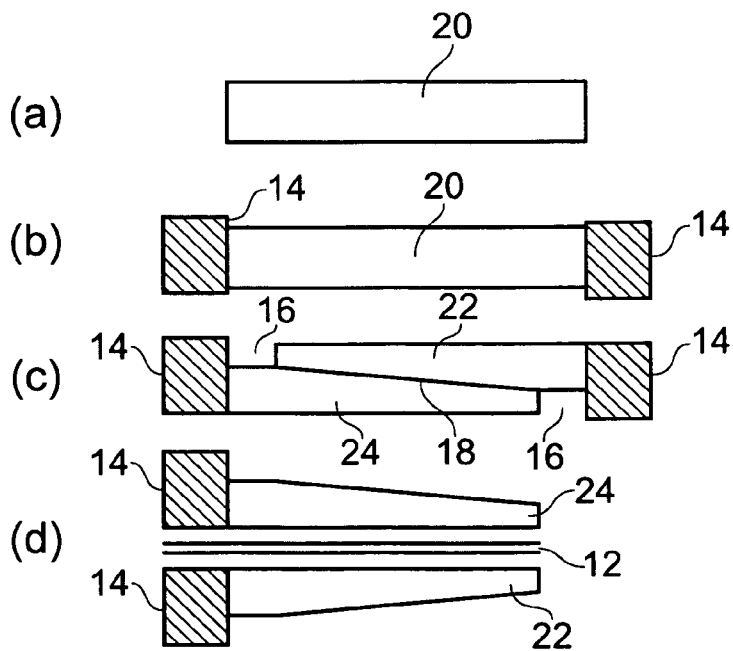
FIG. 2 shows a plan view of a method of manufacturing an aerofoil according to a first embodiment of the invention.

FIG. 2 illustrates a method of manufacturing an aerofoil structure in accordance with a first embodiment of the invention. With reference to FIG. 2(a) a metallic sheet 20 is provided for forming the aerofoil structure. In contrast to sheet 2 of the prior art method illustrated in FIG. 1, sheet 20 is shorter than the required span of the aerofoil.

As illustrated in FIG. 2(b), mounting elements 14 may comprise metallic blocks which are joined to either end of sheet 20. The mounting elements 14 may be joined to the sheet 20 by any suitable joining technique, in particular diffusion bonding, friction stir welding, linear friction welding, electron beam welding or press bonding may be used. The elements 14 are of greater thickness than the sheet 20 and the edge of one of the elements 14 is aligned substantially parallel with one side of the sheet 20 and the edge of the other element 14 is aligned substantially parallel with the other side of the sheet 20. The substantially parallel surfaces created by the aligned edge of the elements 14 and the sheet 2 may be machine finished to ensure a uniform surface.

The forged sheet 20 is then divided along an inclined plane 18 extending in a span-wise direction, so as to produce two substantially identical panels 22 and 24. The panels 22 and 24 need not be identical and alternative configurations may be used in order to provide desired properties for the resulting aerofoil e.g. the panels may be of differing thickness. The panels 22 and 24 may form the pressure and suction surfaces of a blade for a turbomachine. The sheet 20 may be divided into the two panels 22 and 24 by way of any known technique which may be suitable for cutting the required width of the aerofoil, for example by using a band saw. To facilitate the cutting process, channels 16 may be machined inboard of the elements 14 to allow the band saw to enter the workpiece.

The two panels 22 and 24 are then assembled so that their uncut exterior surfaces (which have previously been machine finished) are facing each other. Optionally, a membrane may be positioned between the panels 22 and 24. As previously described, the assembly may then be diffusion bonded and superplastically formed in order to produce the desired external shape of the aerofoil. When joined, the elements 14 combine to form the root of the aerofoil which serves in use to attach the aerofoil, for example, to the hub of the rotor.

Figure 3:
FIG. 3 shows a plan view of a method of manufacturing an aerofoil according to a second embodiment of the invention.

FIG. 3 illustrates a method of manufacturing an aerofoil structure in accordance with a second embodiment of the invention. This embodiment is substantially as per the first embodiment, however the mounting element 14 is joined to the panel 22 or 24 after the sheet 20 has been divided into the two panels. Joining the element 14 after dividing the sheet 20, may simplify the dividing process and remove the need for the machining of channels 16.

In both the first and second embodiments of the invention the elements 14 may be of any shape and thickness required by the application of the aerofoil. Conventionally in the production of an aerofoil, in particular for a fan blade of a turbomachine, there is an inevitable compromise between selecting a material which provides the strength required by the root but also which has the necessary properties for the aerofoil itself, in particular the ductility required to withstand bird strikes. In the present invention, the elements 14 may advantageously be made from a material with different properties to that of the aerofoil itself. Thus the material may be selected specifically for the requirements of the root. This in turn gives increased flexibility in the choice of material used for the aerofoil as it is no longer necessary to compromise for the requirements of both the root and aerofoil. Therefore a material can be chosen with the required ductility, crack propagation resistance, and other characteristics desired. Any combination of materials for the root and aerofoil may be used which can be adequately joined and may include dissimilar elementary metals, metal alloys (for example, different grades of Titanium) and metal matrix composites. The invention also facilitates low cavity or through cavity designs in which there is no membrane to form an internal structure. The percentage hollowness of such a blade is therefore increased which in turn reduces the weight and blade-off energy of the blade. Furthermore, the invention requires a single joining process along the perimeter of the aerofoil, whereas the method described in EP1605135 the aerofoil panels must first be joined and then the root element joined to the aerofoil. This also has added benefits in reducing machining requirements.

Although the invention has been described in reference to an aerofoil for use as a fan blade it may also be employed in an output guide vane, or a wing or other aerofoil structure.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

The invention claimed is:

1. A method of manufacturing an aerofoil structure capable of being diffusion bonded and superplastically formed to create a substantially hollow cavity within the aerofoil structure, the method comprising:
   providing a metallic plate, made from a first metallic material, for forming the aerofoil structure;
   joining mounting elements, made from a second metallic material, the second metallic material being different than the first metallic material, to opposing end surfaces of said metallic plate;
   dividing said plate along a plane extending substantially in a span-wise direction so as to produce two metallic panels each with one of said mounting elements joined thereto;
   assembling the two metallic panels so that the surfaces of the panels opposite to the surfaces which have been divided are facing each other; and
   joining the two metallic panels to one another to form the aerofoil structure;
   wherein the mounting elements are joined to one another to form the root of the aerofoil.

2. A method of manufacturing an aerofoil structure as claimed in claim 1, wherein the thickness of the root of the aerofoil is greater than that of the joined metallic sheets.

3. A method of manufacturing an aerofoil structure as claimed in claim 1, wherein the metallic plate and mounting element and/or the two metallic panels are joined by one or more of: diffusion bonding, friction stir welding, electron beam welding, or press bonding.

4. A method of manufacturing an aerofoil structure capable of being diffusion bonded and superplastically formed to create a substantially hollow cavity within the aerofoil structure, the method comprising:
   providing a metallic plate, made from a first metallic material, for forming the aerofoil structure;
   dividing said plate along a plane extending substantially in a span-wise direction so as to produce two metallic sheets;
   joining mounting elements, made from a second metallic material, the second metallic material being different than the first metallic material, to one end surface of each of said two metallic sheets to form two metallic panels;
   assembling the two metallic panels so that the surfaces of the panels opposite to the surfaces which have been divided are facing each other; and
   joining the two metallic panels to one another to form the aerofoil structure;
   wherein the mounting elements are joined to one another to form the root of the aerofoil.

5. A method of manufacturing an aerofoil structure as claimed in claim 4, wherein the metallic sheet and mounting element and/or the metallic panels are joined by one or more of: diffusion bonding, friction stir welding, electron beam welding, or press bonding.

6. A method of manufacturing an aerofoil structure as claimed in claim 4, wherein the thickness of the root of the aerofoil is greater than that of the joined metallic sheets.

7. A substantially hollow aerofoil structure comprising: two metallic panels, each metallic panel comprising a metallic sheet, made from a first metallic material, joined to a mounting element, made from a second metallic material, the second metallic material being different than the first metallic material;
   the metallic panels being joined together so that the metallic sheets form the aerofoil and the mounting elements form the root of the aerofoil.

8. An aerofoil structure as claimed in claim 7, wherein the thickness of the root of the aerofoil is greater than that of the joined metallic sheets.

9. An aerofoil structure as claimed in claim 7, wherein the metallic sheet and mounting element and/or the metallic panels are joined by one or more of: diffusion bonding, friction stir welding, electron beam welding, or press bonding.

10. An aerofoil structure as claimed in claim 7, wherein the joined metallic panels are superplastically formed.

11. An aerofoil structure as claimed in claim 7, further comprising a membrane sheet between the two metallic panels.

12. A turbomachine comprising an aerofoil structure as claimed in claim 7.

13. A substantially hollow aerofoil structure comprising:
   two metallic panels, each metallic panel comprising a metallic sheet joined to a mounting element, the metallic panels being joined together so that the metallic sheets form the aerofoil and the mounting elements form the root of the aerofoil; and
   a membrane sheet between the two metallic panels.

14. An aerofoil structure as claimed in claim 13, wherein the thickness of the root of the aerofoil is greater than that of the joined metallic sheets.

15. An aerofoil structure as claimed in claim 13, wherein the metallic sheet and mounting element and/or the metallic panels are joined by one or more of: diffusion bonding, friction stir welding, electron beam welding, or press bonding.

16. An aerofoil structure as claimed in claim 13, wherein the joined metallic panels are superplastically formed.

* * * * *